United States Patent
Canim et al.

(10) Patent No.: US 10,528,880 B2
(45) Date of Patent: Jan. 7, 2020

(54) SYSTEM, METHOD AND COMPUTER PROGRAM PRODUCT FOR DETECTING POLICY VIOLATIONS

(71) Applicant: International Business Machines Corporation, Armonk, NY (US)

(72) Inventors: Mustafa Canim, Ossining, NY (US); Robert G. Farrell, Cornwall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 500 days.

(21) Appl. No.: 15/290,658

(22) Filed: Oct. 11, 2016

(65) Prior Publication Data
US 2018/0101779 A1 Apr. 12, 2018

(51) Int. Cl.
*G06N 5/04* (2006.01)
(52) U.S. Cl.
CPC .................... *G06N 5/046* (2013.01)
(58) Field of Classification Search
CPC ................. G06N 5/04; G06N 5/046
See application file for complete search history.

(56) References Cited

U.S. PATENT DOCUMENTS

| | | | |
|---|---|---|---|
| 7,386,505 B1 | 6/2008 | Roth | |
| 8,055,527 B1 * | 11/2011 | Gil | G06Q 10/06 705/7.23 |
| 8,346,683 B2 | 1/2013 | Dybala et al. | |
| 8,352,998 B1 * | 1/2013 | Kougiouris | H04L 63/10 726/1 |
| 9,746,985 B1 * | 8/2017 | Humayun | G06Q 10/10 |
| 2004/0260601 A1 * | 12/2004 | Brief | G06Q 10/06311 705/7.14 |
| 2007/0198432 A1 * | 8/2007 | Pitroda | G06Q 20/02 705/64 |
| 2013/0060776 A1 * | 3/2013 | Perl | G06F 16/367 707/737 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Kamran Afshar
*Assistant Examiner* — Imad Kassim
(74) *Attorney, Agent, or Firm* — Kevin Michael Jordan, Esq.; McGinn IP Law Group, PLLC

(57) ABSTRACT

A policy violation detection computer-implemented method, system, and computer program product, includes extracting a policy activity from a policy, the policy activity including an actor in the policy, an object of the policy, an action of the policy, and policy scope metadata, capturing a transaction by a user including metadata of the transaction, translating the transaction by the user into an actor in the transaction, an action of the transaction, and an object of the transaction, and alerting the user of a policy violation by navigating a knowledge graph is-a hierarchy to relate the actor in the transaction to the actor in the policy, the object of the transaction to an object of the policy, and the action of the transaction to an action of the policy activity.

14 Claims, 4 Drawing Sheets

(56) References Cited

U.S. PATENT DOCUMENTS

| | | | |
|---|---|---|---|
| 2013/0066698 A1* | 3/2013 | Levy | G06Q 30/0283 |
| | | | 705/14.17 |
| 2014/0222633 A1 | 8/2014 | Shortridge | |
| 2014/0277705 A1 | 9/2014 | Czaja et al. | |
| 2014/0317754 A1* | 10/2014 | Niemela | H04L 63/1416 |
| | | | 726/26 |
| 2014/0359691 A1* | 12/2014 | Woods | H04L 63/20 |
| | | | 726/1 |
| 2014/0379156 A1 | 12/2014 | Kamel et al. | |
| 2014/0380402 A1* | 12/2014 | Roth | G06F 21/64 |
| | | | 726/1 |
| 2016/0155072 A1 | 6/2016 | Prodromidis et al. | |
| 2016/0232785 A1 | 8/2016 | Wang | |
| 2016/0241997 A1 | 8/2016 | Lucas | |
| 2017/0061462 A1* | 3/2017 | Bhalgat | G06Q 30/0225 |
| 2017/0193239 A1* | 7/2017 | Chari | G06F 21/577 |
| 2017/0264634 A1* | 9/2017 | Carter | H04L 63/10 |
| 2018/0301222 A1* | 10/2018 | Dew, Sr. | G06Q 50/24 |

OTHER PUBLICATIONS

Sutton Jr., Stanley M. "Text2Test: Automated Inspection of Natural Language Use Cases". ICM Research Report, Oct. 15, 2009.
Brodie, Carolyn A. "An Empirical Study of Natural Language Parsing of Privacy Policy Rules Using the SPARCLE Policy Workbench". IBM T.J. Watson Research Center, Hawthorne, NY.

* cited by examiner

SYSTEM, METHOD AND COMPUTER PROGRAM PRODUCT FOR DETECTING POLICY VIOLATIONS

BACKGROUND

The present invention relates generally to a policy violation detection method, and more particularly, but not by way of limitation, to a system, method, and a computer program product for detecting real-time semantic policy violations for a possible future activity using recent transactions.

People are often subject to policies related to an activity. These policies may be formulated and communicated by a company prior to these people performing or completing the activity or may be communicated during the activity. For example, before booking a flight, the user may be given the cancellation policy to review which will be in effect from when they book the flight to when they check in for the flight. Other policies, such as the baggage policy of the respective airline, may not be communicated directly but can be looked up by the traveler.

However, policies are stated in natural language and thus could be ambiguous or difficult to understand. Further, policies may be stated in complex "legalese" or company-specific jargon. Policies also may be very long and take users a long time to read. Also, users may forget about the policies because there may be a long time between the issuance of the policy and the policy taking effect (e.g., booking a flight and taking the flight some weeks or months later). Or, policies may be implicit or have to be looked up and thus it is easy to violate them. Further, policies are concerned with future actions. In general, people like to be alerted to policies that both are situationally relevant and semantically relevant and warn against possible future actions that the user might perform that would violate the policy.

There is a need in the art to alert users of potential policy violations based on those users' recent transactions.

SUMMARY

In an exemplary embodiment, the present invention can provide a computer-implemented policy violation detection method, the method including extracting a policy activity from a policy, the policy activity including an actor in the policy, an object of the policy, an action of the policy, and policy scope metadata, capturing a transaction by a user including metadata of the transaction, translating the transaction by the user into an actor in the transaction, an action of the transaction, and an object of the transaction, and alerting the user of a policy violation by navigating a knowledge graph is-a hierarchy to relate the actor in the transaction to the actor in the policy, the object of the transaction to an object of the policy, and the action of the transaction to an action of the policy activity.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the present invention may readily be utilized as a basis for the designing of other structures, methods and systems. It is important, therefore, that the claims be regarded as including equivalent constructions within the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
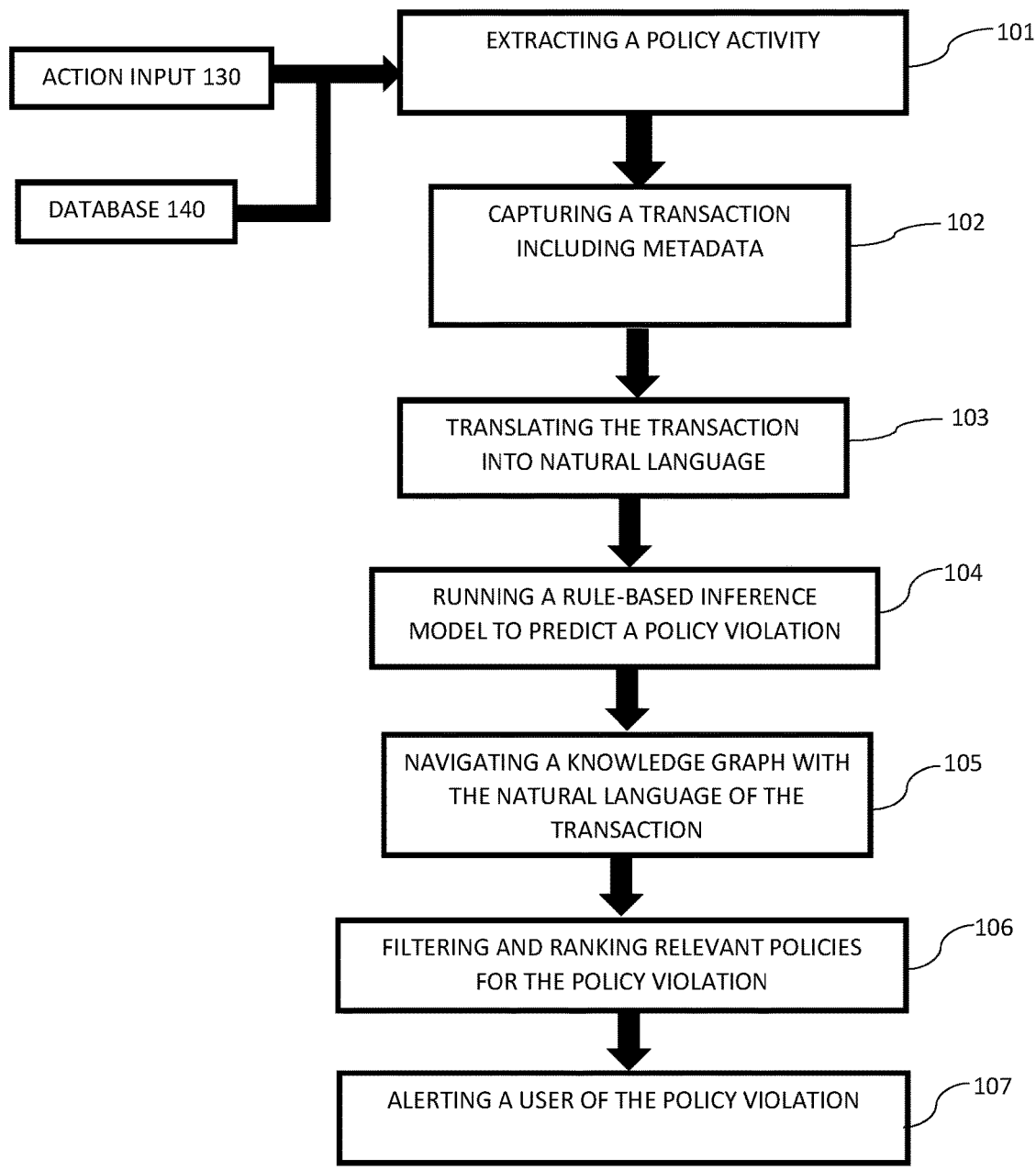
FIG. 1 exemplarily shows a high-level flow chart for a policy violation detection method 100.

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, a policy violation detection method 100 embodiment according to the present invention can include various steps to extract a policy activity of a policy and run a rule-based inference model to predict violations of the policy based on user actions. By way of introduction of the example depicted in FIG. 2, one or more computers of a computer system 12 according to an embodiment of the present invention can include a memory 28 having instructions stored in a storage system to perform the steps of FIG. 1.

Thus, a policy violation detection method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

Referring now to FIG. 1, in step 101, a policy activity is extracted from a database 140 with a policy action, actor, and an object with policy scope metadata (e.g., location, time, etc.) from a policy. Types of the policy can include, for example, privacy policies, security policies, terms of use policies, sales policies, etc. That is, policy activity is extracted from a policy, the policy activity including an actor in the policy, an object of the policy, an action of the policy, and policy scope metadata. For example, policy activity can come from natural language processing of a policy documents, such as an airline baggage policy or a TSA policy.

In step 102, transactions by the user are captured from an action input 130 including metadata (e.g., location, time, etc.). The capturing feature is turned on and off depending on the test for the policy scope (e.g., checking location within policy location, time within policy time, etc.). A transaction can include, for example, a credit card transaction, a direct input of the transaction, an e-mail receipt indicating a transaction, registering for an event as extracted from calendar data, etc.

In step 103, the captured transactions are translated into natural language. The user's name into an actor in the transaction, the type of transaction (buying, selling, attending, etc.) into an action of the transaction, and the object as an object of the transaction. For example, if the transaction extracted in step 102 includes a credit card statement of "Purchase ID: 2564; Item: 104; Cost: $6.49", the credit card transaction is translated to a natural language sentence ("John Doe purchased a Large Iced Coffee"). The translation may involve looking up Item identifiers or numbers in an inventory database. For example, "Item 104" may be a Large Iced Coffee in the database. The transaction may also be translated into a semi-structured transaction language employing natural language such as [actor: "Joe Doe", action: purchase", object: "Large Iced Coffee"]. The translation may involve listing synonyms. That is, there are many types of recent electronic transactions that might indicate an action that could violate a policy, including buy transactions (e.g., buying a coffee), events (e.g., registering attendance at a wine tasting), etc. Each transaction is translated into natural language in order to find similarities between transactions and the policy because these policies are created by different organizations for different purposes.

Because these policies may be created by different organizations for different purposes, natural language may be the best way to compare. The translation may involve more than an actor, object, and action. It may involve parsing prepositional phrases such as "at the airport" into a location, "at 2 PM" into a time, and other common elements of dependency parsing or conceptual parsing. Thus, the user is alerted of a policy violation by navigating a knowledge graph is-a hierarchy to relate the actor in the transaction to the actor in the policy, the object of the transaction to an object of the policy, and the action of the transaction to an action of the policy activity.

Translating the transactions into natural language is necessary to match the transactions with the policy when there is no agreement between the parties. For example, if the transaction is from a Coffee Company while the policy is from an Airline, natural language can be used to compare both even when the Coffee Company and the Airline have to agreement to share and update Airline policies according to the Coffee Company inventory, possible Coffee Company customer actions, and possible Coffee Company customers. Another reason for natural language is that users may want to type in and express their future actions. This would be done in natural language. For example, a Sports Store customer may want to ask a hypothetical, such as "Can I bring my air rifle?". Although other techniques may be more difficult, the transactions can be translated into a plurality of types of languages in which the policy is translated to the same language to extract similarities. In some embodiments, a transaction and a policy may be translated into a common language to facilitate certain features of the present invention e.g., the extraction of similarities.

It is noted that the natural language may be English, French, Spanish, etc. That is, the natural language of the transaction is translated to the same natural language of the policy.

In step 104, inference rules, if applicable, are run to project the transaction forward. The model used is a rule-based inference model for making inferences from an action to a state that are then testing against policies to see if there might be a violation. For example, the inference rules can include (A) if an object is acquired in an airport, then the actor may transport the object through security. Once the rule binds to the action (a Large Iced Coffee is acquired in an airport) then the inference is made to generate the subsequent action (A large Iced Coffee transport through security). The knowledge graph is-a hierarchy is used to match the particular object (large Iced Coffee) to the general object (liquid) and the subsequent action is generated for the general object (liquid transport through security). This subsequent action then violates the policy directly. (B) If someone performs an action even without an object, then the action might enable another action that could violate a policy in the future. (C) If someone changes an object or changes the state of an object, then that also may violate a policy in the future. Thus, in step 104, the inferences rules are run according to at least (A), (B), and (C) to make a prediction about a policy violation. Policy violations can also be checked for locations (using spatial checking of shape bounds and other spatial constraints) and time (checking time line points and closed or open intervals or other temporal constraints).

By way of yet another example only, inference rules can be invoked if someone (desires to) or does change an object or the state of an object. In this example, to check for a possible policy violation in the future. In some embodiments, in step 104, the inferences rules are run according in one or more of the foregoing examples to make a prediction about a policy violation.

In step 105, a knowledge graph is navigated. Knowledge graphs include concepts in an "is-a hierarchy" to relate the types of user, action, and object to the policy user, action, and object types, thereby to verify that the object is related (semantically) to the transaction. For example, coffee is-a beverage is-a liquid. This "is-a hierarchy" can be created using unsupervised learning methods (e.g., utilizing distributional semantics) or accessed as particular relationship links within an existing knowledge graph (e.g., hypernyms in Wordnet). It is important that there be enough coverage of the given objects and types used in both the transactions and the policies and that the is-a relationship links be sufficiently correct for checking the policy violations. Unique or new objects and unusual types may not be found or may be found incorrect in some knowledge graphs, so new policies may need to be tested against captured or stored transactions to verify that the correct policy violations were detected and only the correct ones.

To match the transactions and the policy activities, the transaction is elaborated using the type of user (e.g., "customer"), object (e.g., coffee), and action (e.g., "purchase") and then matched against the policy. The type of actor performing the action may be described in many ways, some of which may violate the policy. Thus, a user profile may be used. For example, a Large Coffee Company may have a reward program that enables customers to enter information about themselves or get this data from a social network. There is a table to map from attributes and values such as "gender: male" to possible knowledge graph nodes, such as "male" or "man", that is, the table includes synonyms. Privacy concerns may result in certain attributes being used and not others for policy violation checking. For example, a person may have their religion in the profile but not want to be alerted to policy violations involving this attribute. The type of object may also be described in many ways. A Large Iced Coffee is a beverage but also a drink. Thus, the system has to navigate the knowledge graph is-a hierarchy from multiple concept starting points. In addition, the policy may be stated in general language instead of talking specifically about each object. For example, the policy may have to do with liquids generally and not coffee per se. The knowledge graph preferably has these relationships already encoded. While matching the transactions and policies, the actor, object, and action terms are expanded with synonyms in order to increase the match probability. The knowledge graph preferably has these synonyms already encoded also. Thus, if the transaction contains the verb "purchase" but the policy says "buy" the term expansion process with the synonyms will help to match these actions.

In step 106, if there is a match between the transaction and the policy (e.g., a policy violation), then each of the policies with potential policy violations are filtered and ranked. That is, there may be constraints that make it unsuitable to alert people to the policy. For example, a user's mobile profile may indicate they do not want to be alerted to certain types of policies or policy violations from certain companies or policy violations having to do with their user profile, the objects they purchase, and so on. Following filtering, the policies are ranked. Also, policies that are violated by multiple actions and/or are a higher level of criticality (low/medium/high) will be ranked higher. Policies that are more specifically related to the actions are ranked higher. For example, policy violations about beverages would be ranked higher than policy violations about liquids generally or physical objects.

In step 107, the user is alerted of the policy violation. The user can be provided with a list of policies. For each policy, a list of violations and potential violations can be provided. The violations can include the transaction text, the matching section of the policy text, and the link to the full policy, but also may include the matching portion of the user's profile, the portion of the is-a hierarchy that was navigated, the location constraint violation, the time constraint violation. These can be surfaced to the user to explain what the user did that violated the policy. For potential violations, the inference rules utilized and leading to the potential policy violation may also be presented to the user as an explanation. Then the policy information may be sent to a user on a personal device, such as a mobile phone, computer, tablet, watch, car computer, kiosk, etc.

Thereby, activities by the user are extracted from a policy stated in natural language with a (time/location) scope in which behavioral traces of specific users involving specific actions on specific object(s) when within the (time/location) scope are recorded, and the user is alerted of the policy's permissions for the activity if the types of actions in the behavioral traces are semantically related to the types of actions in the policy activity. "Semantically related" is established using a knowledge graph, a rule-based inference, or both, "actions" include types of users, types of actions, and/or types of objects, and "behavioral traces" are transactions, logs of user actions, results of video analysis, etc.

In one exemplary embodiment, a traveler can download an application to their mobile phone that asks for permission to access transaction receipts from participating vendors and also to receive policies from the TSA. For example, a new policy just issued by the TSA that is a policy on bringing liquids on the plane. It also has structured data with who the policy impacts (travelers), where (e.g., U.S. Airports) and when this policy is in effect (e.g., now and hereafter) (e.g., extracted in step 101). A user performs a transaction at a coffee shop in which the transaction is captured including the metadata and the transaction is translated into natural language of "buys a coffee" (e.g., in steps 102-103). The user receives an alert (e.g., step 107) with the new policy on their mobile device indicating that "you are allowed to bring a quart-sized bag of liquids, aerosols, gels, creams and pastes in your carry-on bag and through the checkpoint. These are limited to travel-sized containers that are 3.4 ounces (100 milliliters) or less per item. Placing these items in the small bag and separating from your carry-on baggage facilitates the screening process. Pack items that are in containers larger than 3.4 ounces or 100 milliliters in checked baggage". That is, a rule-based inference is run and a knowledge graph is navigated to determine a potential policy violation based on the transaction of buying the coffee in which the policy that has been violated (or will be violated) is alerted to the user (e.g., steps 104-107).

In some embodiments, a (non)-permitted activity can be identified with a type of object for a type of user from a natural language policy in which the transaction of a specific type of activity by a specific user involving a specific type of object is recorded such that an action is performed to communicate the (non)-permitted activity to a user if a knowledge graph indicates that the specific type of object is of the given type.

In another embodiment, the action can include alerting the user, a friend of the user, a party to the transaction, or a party to the policy, or owner of the transaction, or owner of the policy. Also, the action can involve preventing the transaction. Further, the transaction can include a sale/purchase, invest/divest, borrowing, construction, accepting/declining an invitation, entering/leaving a location, entering/leaving a location during a time period, an action on a computer system or device, a back-end action on a server a cloud-based computing operation, etc. Moreover, a type can include a known classification of a string of tokens, where the type is in a graph, where the graph related types to one another and the instance is related to the type in the graph. The graph can include Wordnet, Freebase, Yago, or any other graph with types that classify string of natural language tokens in text.

In an alternate embodiment, an inference rule is applied to the transaction resulting in a potential future action which is then checked for a policy violation using the same methods as were applied to the transaction itself, including by navigating the knowledge graph is-a hierarchy.

In some embodiments, the action, object, and action of the transaction are stated in natural language where the action is a verb or verb phrase of a sentence, the object is a noun or noun phrase object of the same sentence, and the actor is a noun or noun phrase subject of that sentence.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
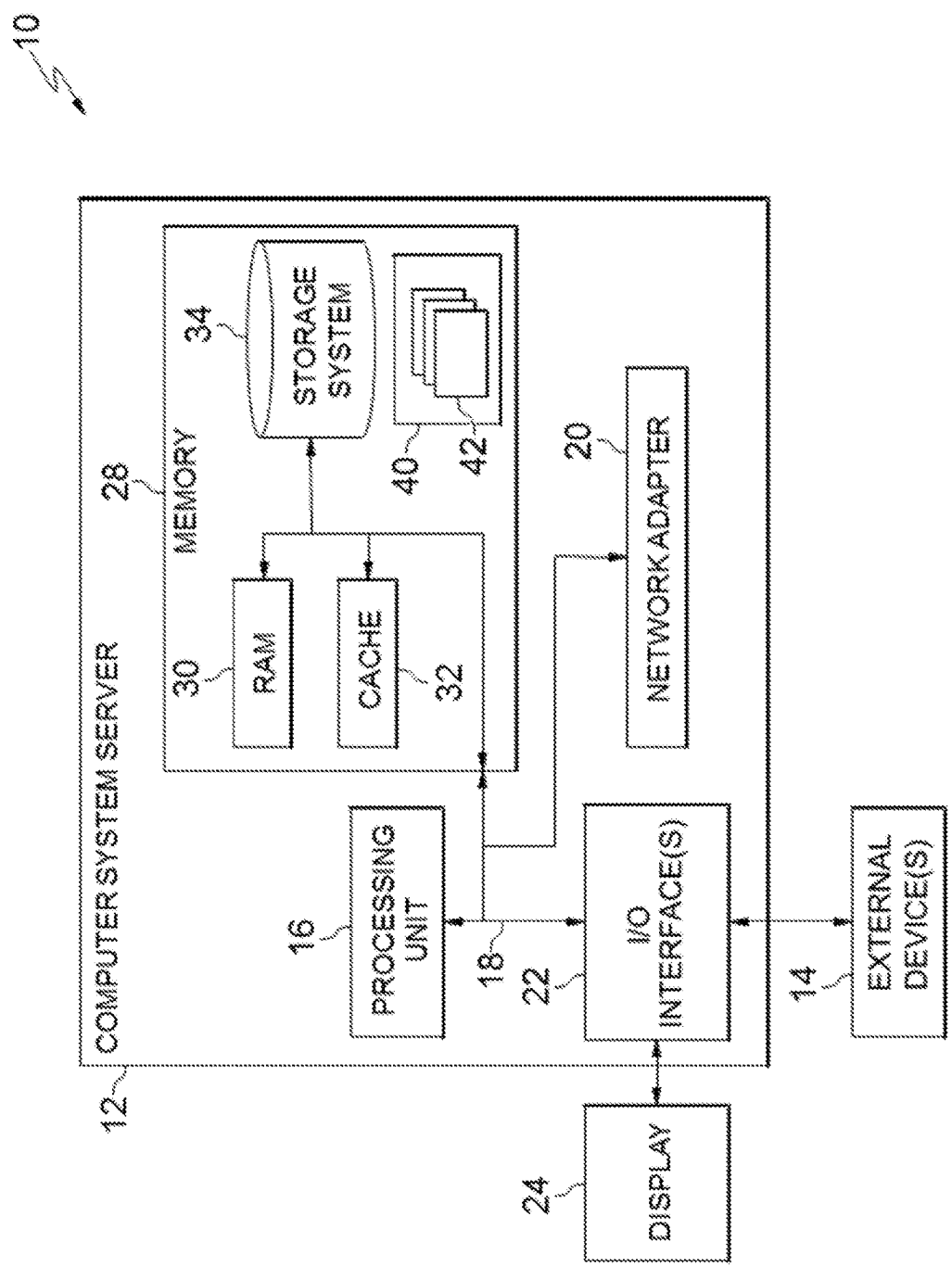
FIG. 2 depicts a cloud-computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
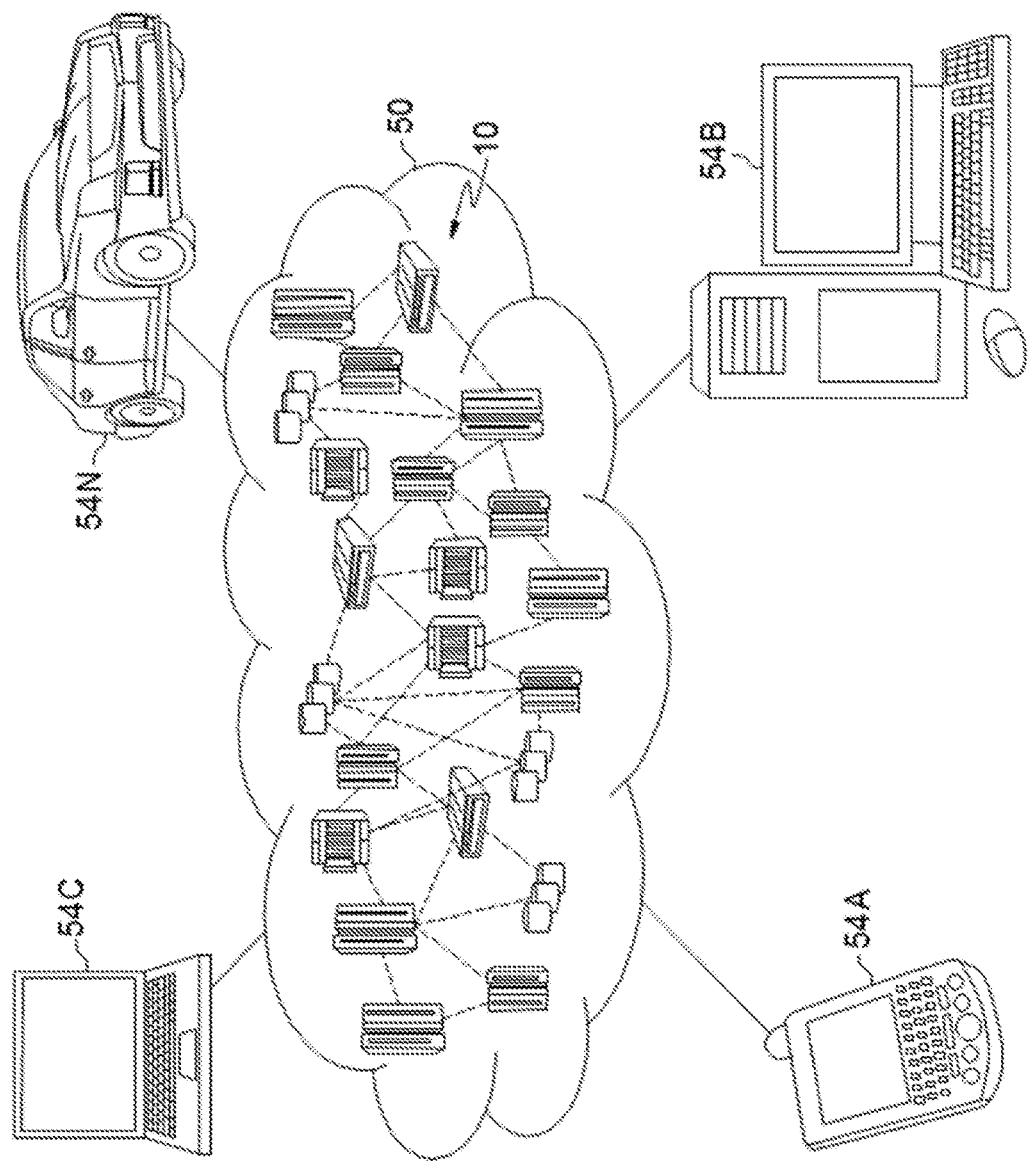
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
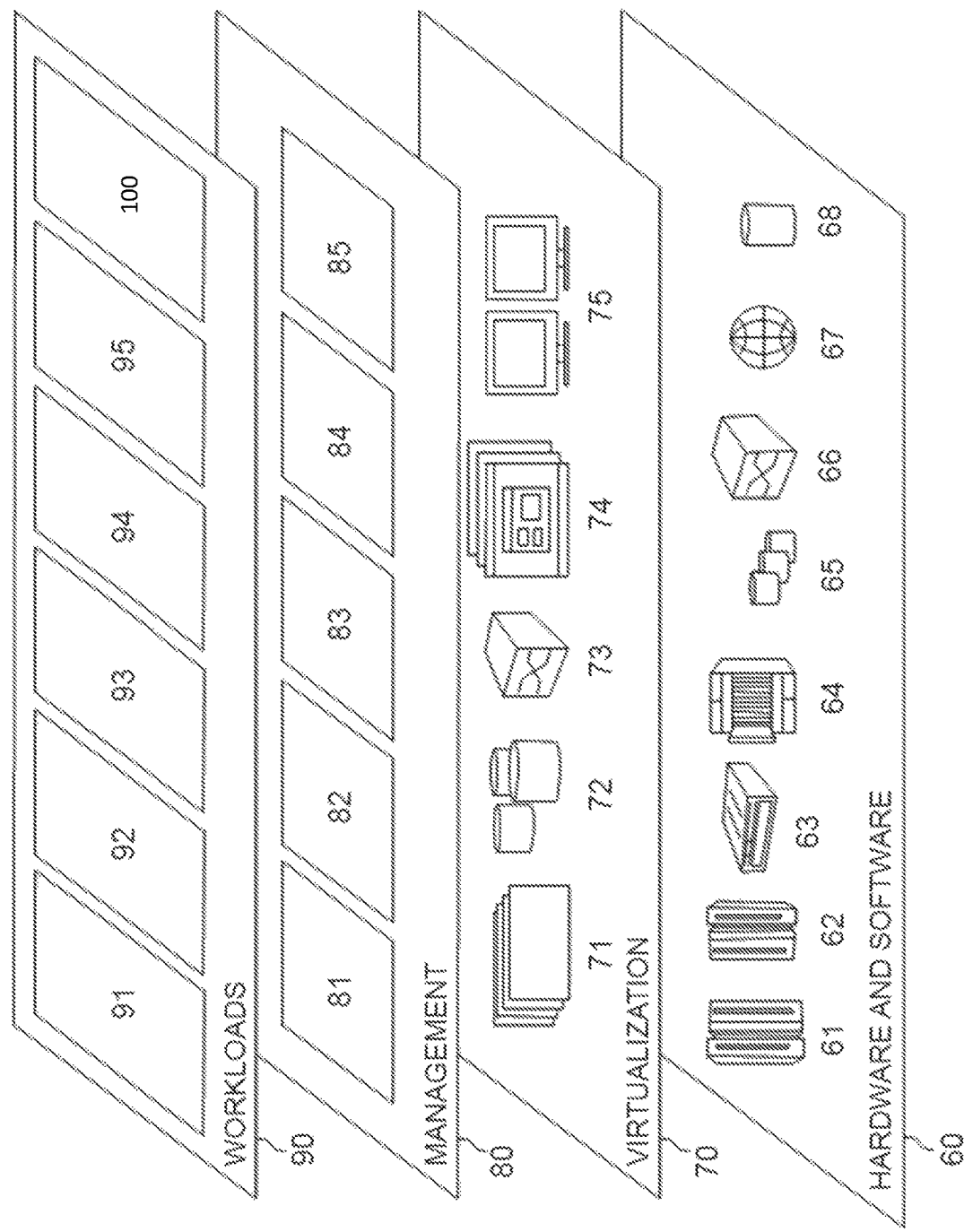
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the policy violation detection method 100.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented policy violation detection method, the method comprising:
    extracting a policy activity from a policy, the policy activity including an actor in the policy, an object within the policy, an action of the policy, and policy scope metadata, the object being a tangible, physical object;
    capturing a transaction by a user including metadata of the transaction;
    translating the transaction by the user into an actor in the transaction, an action of the transaction, and an object of the transaction; and
    alerting the user of a policy violation by navigating a knowledge graph is-a hierarchy to relate the actor in the transaction to the actor in the policy, the object of the transaction to an object within the policy, and the action of the transaction to an action of the policy activity, thereby to verify that the object is related semantically to the transaction,
    wherein the alerting alerts the user of the at least one policy violation by running a rule-based inference model to predict if a portion of the policy activity is violated by a future action with the object of the transaction by the user based on an inference rule between the natural language of the transaction and the policy activity, and
    wherein the rule-based inference model includes:
        an inference rule to check the object against the policy if an object is acquired;
        an inference rule to check if the action enables a second action that can violate the policy in the future if the user does the action without the object; and
        an inference rule based on if the user changes the object or changes a state of the object that can violate the in the future.

2. The computer-implemented method of claim 1, further comprising filtering and ranking relevant sub-policies in the policy by a criticality level of the policy violation when the alerting alerts the user of a plurality of policy violations.

3. The computer-implemented method of claim 1, wherein the alerting the user of at least one a policy violation alerts at least one of the user, a friend of the user, a party to the transaction, a party to the policy, an owner of the transaction, and an owner of the policy.

4. The computer-implemented method of claim 1, wherein a type of the transaction captured by the capturing is selected from a group consisting of:
    a sale/purchase transaction;
    an invest/divest transaction;
    a borrowing transaction;
    a construction transaction;
    an invitation accept/decline transaction;
    an entering/leaving a location transaction;
    an entering/leaving a location during a time period transaction; and
    a transaction on a computer system or device.

5. The computer-implemented method of claim 1, wherein the alerting communicates the activity causing the policy violation to the user if the knowledge graph indicates that a specific type of the object is of a given type,
    wherein the given type comprises a known classification of a string of tokens,
    wherein the given type is in a graph,
    wherein the graph is selected from a group consisting of:
        Wordnet;
        Freebase; and
        Yago.

6. The computer-implemented method of claim 1, wherein an inference rule is applied to the transaction resulting in a potential future action which is then checked for the policy violation by navigating the knowledge graph is-a hierarchy.

7. The computer-implemented method of claim 1, wherein the action, the object, and the actor in the transaction are stated in natural language where the action comprises a verb or a verb phrase of a sentence, the object comprises a noun or a noun phrase object of the same sentence, and the actor comprises a noun or a noun phrase subject of that sentence.

8. The computer-implemented method of claim 1, embodied in a cloud-computing environment.

9. A computer program product for policy violation detection, the computer program product comprising a computer-readable storage medium having program instructions embodied therewith, the program instructions executable by a device to cause the device to perform:
    extracting a policy activity from a policy, the policy activity including an actor in the policy, an object within the policy, an action of the policy, and policy scope metadata, the object being a tangible, physical object;
    capturing a transaction by a user including metadata of the transaction;
    translating the transaction by the user into an actor in the transaction, an action of the transaction, and an object of the transaction; and
    alerting the user of a policy violation by navigating a knowledge graph is a hierarchy to relate the actor in the transaction to the actor in the policy, the object of the transaction to an object within the policy, and the action of the transaction to an action of the policy activity, thereby to verify that the object is related semantically to the transaction,
    wherein the alerting alerts the user of the at least one policy violation by running a rule-based inference model to predict if a portion of the policy activity is violated by a future action with the object of the transaction by the user based on an inference rule between the natural language of the transaction and the policy activity, and
    wherein the rule-based inference model includes:
        an inference rule to check the object against the policy if all object is acquired;
        an inference rule to check if the action enables a second action that can violate the policy in the future if the user does the action without the object; and
    an inference rule based on if the user changes the object or changes a state of the object that can violate, the policy in the future.

10. The computer program product of claim 9, further comprising filtering and ranking relevant sub-policies in the policy by a criticality level of the policy violation when the alerting alerts the user of a plurality of policy violations.

11. The computer program product of claim 9, wherein the alerting the user of at least one a policy violation alerts at least one of the user, a friend of the user, a party to the transaction, a party to the policy, an owner of the transaction, and an owner of the policy.

12. A policy violation detection system, said system comprising:
   a processor; and
   a memory, the memory storing instructions to cause the processor to perform:
      extracting a policy activity from a policy, the policy activity including an actor in the policy, an object within the policy, an action of the policy, and policy scope metadata, the object being a tangible, physical object;
      capturing a transaction by a user including metadata of the transaction;
      translating the transaction by the user into natural language indicating an actor in the transaction, a verb phrase for an object of the transaction, and a noun phrase of the transaction; and
   alerting the user of a policy violation by navigating a knowledge graph is-hierarchy to relate the natural language of a future action with the object of the transaction to the portion of the policy activity, relate the object of the transaction to the object within the policy, and verify that the object within the policy is related to the future action with the object of the transaction, thereby to verify that the object is related semantically to the transaction,
   wherein the alerting alerts the user of the at least one policy violation by running a rule-based inference model to predict if a portion of the policy activity is violated by a future action with the object of the transaction by the user based on an inference rule between the natural language of the transaction and the policy activity, and
   wherein the rule-based inference model includes:
      an inference rule to check the object against the policy if an object is acquired;
      are inference rule to check if the action enables a second action that can violate the policy in the future if the user does the action without the object; and
      an inference rule based on if the user changes the object or changes a state of the object that can violate the policy in the future.

13. The system of claim 12, further comprising filtering and ranking relevant sub-policies in the policy by a criticality level of the policy violation when the alerting alerts the user of a plurality of policy violations.

14. The system of claim 12, embodied in a cloud-computing environment.

* * * * *